March 7, 1967 G. R. GERHARD ETAL 3,307,215
CONTROL APPARATUS FOR INDUSTRIAL APPARATUS
Filed April 9, 1964 8 Sheets-Sheet 2

INVENTORS
GEORGE R. GERHARD
GEORGE I. DOERING
BY William T. Fryer III
ATTORNEY March 7, 1967   G. R. GERHARD ET AL   3,307,215
CONTROL APPARATUS FOR INDUSTRIAL APPARATUS
Filed April 9, 1964   8 Sheets-Sheet 6

INVENTORS
GEORGE R. GERHARD
GEORGE I. DOERING
BY William T. Fryer III
ATTORNEY

March 7, 1967 G. R. GERHARD ET AL 3,307,215
CONTROL APPARATUS FOR INDUSTRIAL APPARATUS
Filed April 9, 1964 8 Sheets-Sheet 8

INVENTORS
GEORGE R. GERHARD
GEORGE I. DOERING

BY William T. Fryer III

ATTORNEY

United States Patent Office 3,307,215
Patented Mar. 7, 1967

3,307,215
CONTROL APPARATUS FOR INDUSTRIAL
APPARATUS
George R. Gerhard and George I. Doering, Columbus,
Ohio, assignors to Industrial Nucleonics Corporation,
a corporation of Ohio
Filed Apr. 9, 1964, Ser. No. 358,573
8 Claims. (Cl. 18—2)

This invention relates to a control apparatus for industrial apparatus. More particularly, the present invention is concerned with a control apparatus for a regulating apparatus to maintain a material property at a target property.

The present invention has application to many types and arrangements of regulating apparatuses where a material is produced, treated or manipulated in some fashion to achieve a uniform target property across a material dimension. The property can be of several kinds, such as moisture content, material thickness, hardness, or other physical characteristics, for example. The following description of the present invention uses as a preferred embodiment a casting line for forming and controlling the thickness of a film. However, this particular regulating apparatus is merely one example of a suitable type and the application of the present invention to other types and arrangements of apparatus will be apparent.

One of the important considerations in adjusting a film casting apparatus, as in other types of regulating apparatuses, is to maintain as uniform a weight per unit area as possible across the film width at the desired target thickness. The term thickness is interchangeable with weight per unit area, if material density is constant and is used herein in this manner. The thickness across the width, generally termed the profile thickness, can vary either above or below the target thickness. The adjustment of the film casting apparatus must achieve, as much as possible, a uniform profile thickness as well as a profile thickness that is at the target thickness.

A film may have both transverse property variations and machine direction variations. These two variations combine to determine the film profile. Where medium or short term machine direction variations are present, the process or apparatus forming the film can be adjusted to minimize or substantially eliminate the machine direction variations, consistent with the process capabilities. In addition, the control apparatus can be adjusted to minimize the effect of machine direction variations. Once the mahcine direction variations are minimized or eliminated, the control apparatus can adjust the regulating apparatus, changing the film thickness across the sheet to bring the film profile to a target thickness.

It is an object of the present invention to provide a control system for maintaining a property across a material dimension at a target property.

It is a further object of the present invention to provide a control system for rapidly adjusting a material property to a target property when any property deviation from the target property occurs.

It is a further object of the present invention to provide a control apparatus for adjusting a material property to closely approach a uniform property at a target thickness across a dimension of the material.

These and other objects that are apparent from the description to follow are accomplished by the method and control apparatus of the present invention. In one form of the method an apparatus is controlled having adjustments for separately changing the material property in individual zones across the material dimension and another adjustment that uniformly changes the property across the material dimension including the individual zones. The separate adjustments are actuated to change the average material property in each of the zones toward the property average across the material dimension including the individual zones. The amount of adjustment is a function of the difference betwen the zone average property and the property average across the material dimension including the individual zones. Then another adjustment is actuated to change the material property toward the target property as a function of the difference between the property average across the material dimension including the individual zones and the target property.

One arrangement of the control apparatus in accordance with the present invention controls a regulating apparatus having first means for separately varying a property in individual zones across a material dimension and a second means for uniformly varying the property across the material dimension including the zones. The control apparatus indicates the property average across the material dimension including the zones and the property average of each of the zones. The control apparatus includes a control means that compares the property average indication across the material width including the zones with the property average indication for each of the zones and produces a first control signal for actuating the first means to vary the property in each of the zones toward the property average across the material dimension including the zones. The first control signal is a function of the difference between the zone property average and the property average across the material width including the zones. The control means also compares the property average indication across the material dimension including the zones and a target property and produces a second control signal for actuating the second means and uniformly varying the property across the material dimension toward the property target. The second control signal is a function of the difference between the property target and the proprety average measurement across the material dimension including the zones.

A detailed description of a preferred embodiment of the present invention commences, reference being made to the drawings, wherein.

FIG. 11 is a detailed circuit diagram of part of a control apparatus for adjustment of a film casting line as depicted in part in FIG. 9 and shown in FIGS. 4 and 5.

Figure 1:
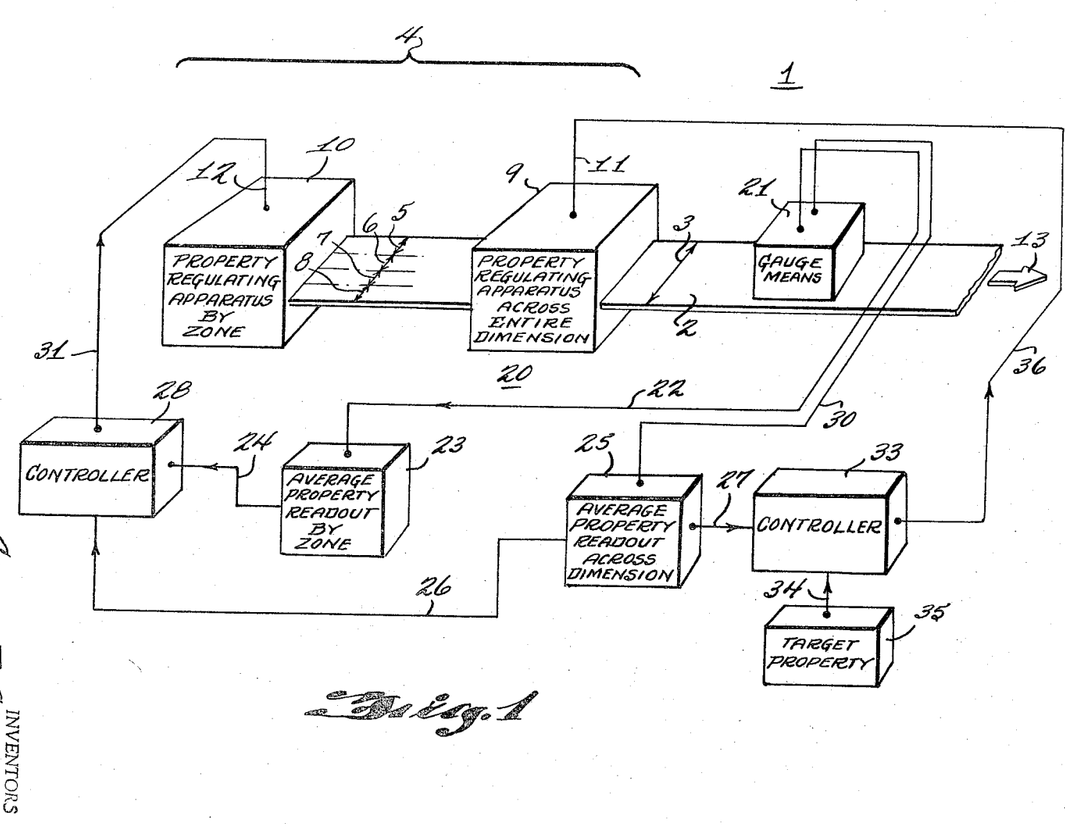
FIG. 1 shows one arrangement of a control apparatus in a block diagram in accordance with the present invention.

A general arrangement of a property regulating system 1 in accordance with the present invention is illustrated in FIG. 1, wherein a property of material 2 across a dimension, here the width 3, can be changed by a regulating apparatus 4. Regulating apparatus 4 has two main functions: (1) to uniformly change the property across material width 3, either to increase or decrease the property, and (2) to uniformly change the property separately in each of zones 5, 6, 7, and 8 across the material width 3, either to increase or decrease the property. These functions can be performed by a number of combinations of apparatuses. The illustrated combination of regulating apparatus 4 utilizes a separate regulating stage 9 that can be energized by a control signal at input 11 to uniformly vary the property across the material width 3 and a regulating stage 10 that can be energized by a control signal at input 12 to separately vary the property in each of zones 5, 6, 7, and 8. Material 2 passes successively through regulating stages 10 and 9 in the direction of arrow 13.

With further regard to regulating apparatus 4 the relative position of regulating stages 9 and 10 can be reversed or a single stage can perform both of the aforementioned functions. The property can be changed along any dimension to suit the needs of a particular material. The separate adjustment of zone property by regulating stage 10 refers to a predominate change, either increasing or decreasing of the property in one zone. The other zones may be affected to a lesser extent or not at all.

The purpose of the present invention, as mentioned previously, is to maintain the material property across the dimension, here width 3, at a target property uniformly across the dimension. The machine direction variations in material 2 are preferably minimized, by adjustment of the forming process or apparatus, for most effective profile control, consistent with the process capabilities. Regulating apparatus 4 is adjusted in accordance with the method of the present invention to achieve this object. The average property across the width 3 is measured. This average property is compared with the average property of each of zones 5, 6, 7, and 8 across width 3. Regulating stage 10 is adjusted to bring the property average of each of zones 5, 6, 7, and 8 toward the average property across width 3 as a function of the difference between the zone average property and the average property across width 3. For example, regulating stage 10 can be adjusted to bring the property average of each of zones 5, 6, 7, and 8 to the average property across width 3. Regulating stage 9 is adjusted to bring the average property across width 3 toward the target property as a function of the difference between the average property across width 3 and the target property. For example, regulating stage 9 can be adjusted to change the material property from the property average across width 3 to the target property. The adjustments need not be in the described order and can be simultaneous or successive, as desired for optimum control for a particular type of regulating apparatus.

The adjustment of regulating apparatus 4 to practice the aforementioned method can be implemented by several forms and arrangements of control apparatus, as well as by manual control. As an example, control apparatus 20 (FIG. 1) is capable of adjusting regulating apparatus 4. The property across width 3 is measured by gauge means 21, which can include, for example, at least one of several conventional gauges for measurement of the particular property that is controlled. Gauge means 21 is coupled over line 22 to a readout device 23 that has an output signal over line 24 indicating the average property for each of zones 5, 6, 7, and 8. Gauge means 21 also is coupled over line 30 to readout device 25 that has an output over lines 26 and 27 that is a function of the average property across width 3.

The comparison of the outputs from readout devices 23 and 25 is the function of a controller 28 that receives these signals over lines 24 and 26, respectively. Controller 28 energizes regulating stage 10 to change each zone property only if the respective zone average property does not substantially equal the width average property. A control signal over line 31 from controller 28 to regulating apparatus input 12 actuates the appropriate zone control means in regulating apparatus 10 to bring the respective zone property average to the width property average, for example.

The adjustment of regulating stage 9 is in response to the difference between the material property across width 3 and a target property. This comparison is performed by a controller 33 that receives the output signal from readout device 25 over line 27 and a target signal over line 34 from a target source 35. Controller 33 provides an output signal over line 36 to input 11 of regulating stage 9 to change the property substantially uniformly across width 3. The amount of property change is a function of the difference between the dimension property average and the target property to reduce the difference therebetween to substantially zero.

Following the adjustment of regulating stage 10 to the extent necessary to equalize the property of zones 5, 6, 7, and 8, at the dimension average property, for example, and the adjustment of regulating stage 9 for the difference between the dimension average property and the target property, the property across width 3 is substantially at the target property and uniform.

The adjustment of zone average property and width average property is always aimed at equality between zones at the target property. However, the presence of error inherent in manual control, or apparatus time delay, inertia and built in dead-bands can account for something less than total and exact equality being reached. However, there still is an improvement in material uniformity and control to the target property with the present invention.

The measurement and indication of the average property in each of zones 5, 6, 7, and 8 can be accomplished in at least two preferred ways. In one arrangement a gauge can be positioned at a location along width 3, in the zone where experience has shown that a property measurement is substantially at the average property for the zone. This indication can be coupled to readout device 23. Another arrangement is to scan the zone with a gauge that measures the property and computes the zone average property. The indication of average property can be coupled over line 22 to readout device 23. The width average property is obtained by scanning the width 3 with a gauge to indicate the property and computing the width average property. The indication of width average property is coupled over line 30 to readout device 25.

Figure 2:
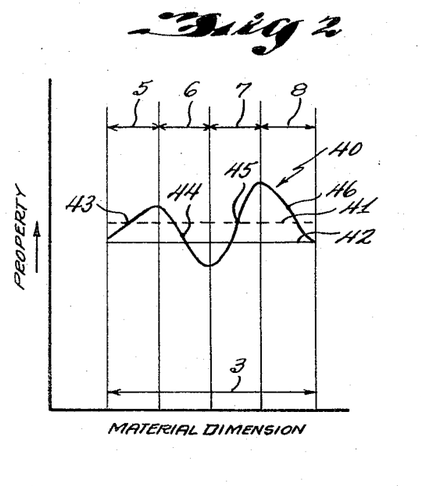
FIG. 2 is a graph for illustrating one form of the method of the present invention showing a property profile, the property average, and the target across a material dimension.
Figure 3:
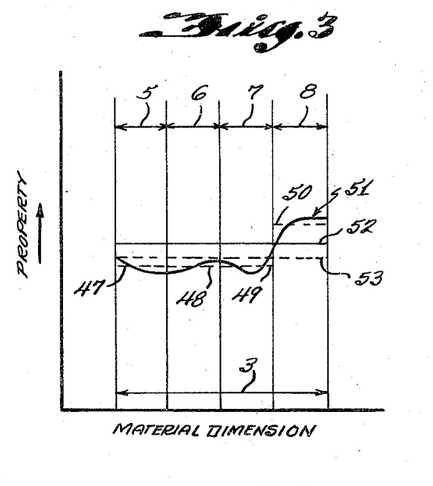
FIG. 3 is another graph for illustrating the method of the present invention showing a property profile, the property average in each of several zones, the average property, and a target across a material dimension.

The control method of the present invention is illustrated graphically by reference to FIGS. 2 and 3. Zones 5, 6, 7, and 8 and width 3 are marked off.

In FIG. 2 the property profile curve 40 has an average property across width 3 represented by line 41 and the target property is represented by line 42. The average property of zones 5, 6, 7, and 8 in FIG. 2 are at locations 43, 44, 45, and 46, respectively. Assuming that experience shows that the property at these locations substantially follows the average property for the respective zones, a gauge for measuring the property can be placed at each of these locations, either simultaneously or successively. Controller 28 adjusts regulating stage 10, for example, to bring the property at these locations to the width average property 41. The average property of zones 5 and 7 are already at the width property average 41, so no change occurs in these zones. The average property of zone 8 is higher than the width property average 41 and is decreased to the width property average 41. The property average of zone 6 is below the width property average 41 and it is increased to the width property average 41. Simultaneous with or before or after the zone adjustments, regulating stage 9 is adjusted to uniformly change the width property in proportion to the difference between target property 42 and the width average property 41. The combined effect of these adjustments is to bring the property all along width 3 to the target property.

In the arrangement of gauge means 3 where each of zones 5, 6, 7, and 8 is scanned, the average property for each zone is computed, represented by lines 47, 48, 49, and 50, respectively, in FIG. 3. The zones 5, 6, 7, and 8 and width 3 are marked off and the property target and width average property for property profile curve 51 are represented by lines 52 and 53, respectively. The average property 47, 48, and 49 of zones 5, 6, and 7, respectively, are each increased by control action from controller 28, for example, to the width property average 53. The property average 50 of zone 8 is decreased to width property average 53, for example. Simultaneously, or before or after these adjustments, regulating stage 9 is energized by controller 33 to increase uniformly the property across width 3 in proportion to the difference between the width property average 53 and target property 52. The combined effect of these adjustments is to bring the width property average 53 across width 3 substantially to target property 52 and to have the property across width 3 substantially uniform.

As mentioned briefly before, the present invention can be employed with many types and arrangements of regulating apparatus. The regulating apparatus need only perform the functions of separate uniform adjustment of the property of each zone and separate adjustment of the property across the material dimension including the zones. Such arrangements can be found in paper machines for controlling the flow regulating elements that determine paper thickness, steel rolling mills, rubber calenders, and film casting lines, for example only. A film casting line 60 (FIGS. 4 and 5) has been chosen to illustrate a preferred embodiment of the present invention.

Film casting line 60 is a typical arrangement for producing a sheet 61 of plastic, for example, eventually wound on a winding roll 62. The formation of sheet 61 starts with plastic ingredients placed in hopper 62 being converted to a liquid state in screw housing 63 of extruder 66, and fed through a heated adapter pipe 64 to extruder die 65. Extruder 66 is driven by a motor 67 (FIG. 4) having a conventional motor speed control mechanism 68, such as a variable power resistor with a shaft rotated by a controller 69, such as a servomotor, in response to a control signal at input 90 of controller 69.

Sheet 61 preferably has minimum machine direction variation consistent with the process capabilities. An effective "tune up" of the sheet forming apparatus can minimize the machine direction variations.

Extruder die 65 has several die actuating mechanisms 70 (FIG. 4) across its length to permit separate adjustment of the die gap at zones across the die length. Extruder die 65 can be of the type manufactured by Black Clawson, identified as a Mark V having adjustable thimbles that vary the spacing of one lip across the die length. The die actuating mechanisms 70 can be separately adjusted by a controller 71 that receives a control signal at one of inputs 72, 73, 74, 75, 76 to actuate a different one of the die actuating mechanisms 70, as represented by dash line 76. Controller 71 can automatically adjust the die actuating mechanisms 70 in response to their respective control signals. A suitable manually set automatically operating controller is described in the article "Automatic Profile Control," by Harold E. Spon-augle, appearing in the June 1963 issue, vol. 19, No. 6, of the Society of Plastics Engineers Journal. In the described apparatus each die actuating mechanism 70 has a separate actuating gear, which initiates a unit adjustment for each pass of an adjusting rack. It is apparent that controller 71 can provide separate and automatic adjustment of each of die actuating mechanisms 70 in direct proportion to the control signal and in a direction determined by the control signal through conventional arrangements of mechanical transmissions and servomotors.

Sheet 61 is extruded from die 65 between a cooling roll 80 and polishing roll 81, over an idler to roll 82 to pull stand rolls 83, and over an idler roll 84 to winding roll 62. Cooling roll 80, pull stand rolls 83, and winding roll 62 are rotated at the same speed by a motor 85 coupled by a transmission 86 (FIG. 5) to these rolls. The speed of motor 85 can be varied by a motor speed control mechanism 87, such as a variable power resistor having a shaft driven by a controller 88, such as a servomotor, to a position in response to a control signal at input 89 of controller 88.

The thickness of sheet 61 can be changed uniformly across its width by at least two adjustments. The speed of extruder motor 67 can be changed to alter the flow of liquid plastic by applying a control signal to controller input 90. Alternatively, the speed of cooling roll 80, pull rolls 83 and winding roll 62 can be changed together to alter the stretch introduced at cooling roll 82 by applying a control signal to controller input 89 that changes the speed of motor 85. The separate adjustment of the thickness of zones across the sheet width is provided by manipulating the actuating mechanisms 70 in response to a control signal at the appropriate one of inputs 72, 73, 74, 75, and 76 of controller 71. The adjustment of one zone does affect the other zones but a predominate change in the control zone is realized, particularly considering the small corrections normally encountered under production conditions.

Between idler roll 84 and winding roll 62 are disposed radiation transmission gauges 90 and 91 for measuring the thickness of sheet 61 at locations. Gauges 90 and 91 are mounted on a frame generally called an O bracket consisting of parallel bars 92 (one set of bars not shown) that support the radiation source (not shown) on one side of sheet 61 and the detectors 93 and 94 of gauges 90 and 91, respectively, on the other side of sheet 61. Each of detectors 93 and 94 is capable of being driven in the directions of arrows 95 and positioned by separate conventional control means to be described in further detail hereinafter to provide the thickness measurements or indications needed to affect the changes that keep the thickness of sheet 61 at a target thickness.

Figure 6:
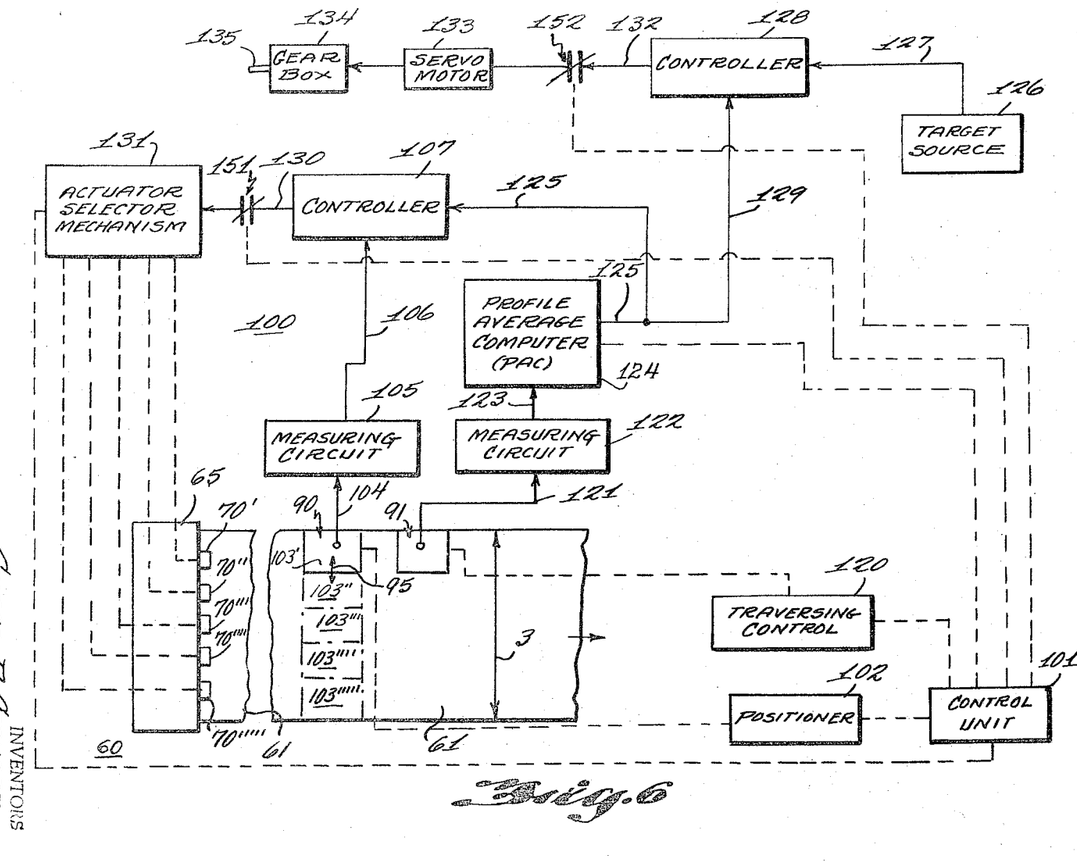
FIG. 6 shows a control apparatus for adjusting the film casting line shown in FIGS. 4 and 5 in accordance with the present invention.

Several types of control apparatus with conventional components arranged in accordance with the present invention can be employed to maintain a target film thickness on casting line 60, or any other regulating apparatus. For example, FIG. 6 illustrates a control apparatus 100 utilizing gauges 90 and 91 (film casting line 60 is shown only in part and the die actuating mechanisms 70 are differentiated by prime markings). The control signals to be derived by control apparatus are (1) a signal that is a function of the thickness average for each zone across the width of sheet 61 corresponding to the area about a die actuating mechanism 70, (2) a signal that is a function of the target thickness, and (3) a signal that is a function of the average thickness across the entire width 3.

Control apparatus 100 obtains the control signal that is a function of a zone average thickness by having control unit 101 actuate positioner 102 to place gauge 90 in successive stationary positions 103 (gauge 90 is shown in position 103′ in FIG. 6 and the other positions are designated by different prime marks). Positions 103 are chosen to be at locations opposite where the thickness of sheet 61 substantially follows the average thickness of a zone corresponding to the aea of effective adjustment for the adjacent die actuating mechanism 70. An output signal from gauge 90 over line 104 to a measuring circuit 105 provides an output signal over line 106 to one input of controller 107 that is successively a function of the thickness of sheet 61 at each of the measured locations for positions 103 of gauge 90, corresponding to the average thickness of the respective zones within which the measurements are made.

The signal that is a function of the average thickness across width 3 is obtained using gauge 91 that is moved by traversing control 120, upon actuation by control unit 101 across width 3. Gauge 91 provides an output signal over line 121 to a measuring circuit 122 that is a function of the thickness of sheet 61 along the scanned width 3. Measuring circuit 122, like measuring circuit 105, is of conventional design in association with a radiation gauge for standardization and application of the gauge output signal to produce an output signal over line 123 that is a function of the measured thickness. The output signal from measuring circuit 122 is coupled to a profile average computer (PAC) 124 that produces an output signal over line 125 that is a function of the width average thickness. PAC 124 integrates the measuring circuit output signal and thereby determines the average of this output signal. The output signal from PAC 124 is coupled also to a controller 128 over line 129.

The target thickness signal is furnished by a target source 126 over line 127 coupled to controller 128 to complete the list of signals required to initiate adjustment of film casting line 60.

Following the computation of the width average thickness in the form of the integrator output signal, this signal is compared by controller 107 successively with the average thickness output signal from measuring circuit 105 for each zone, corresponding to the output signal for each position of gauge 90. Controller 107 provides a control signal over line 130 which is a function of the difference between the width average thickness signal and the zone average thickness signal through a normally closed contact 151, actuated at another time by control unit 101, to an actuator mechanism selector 131. Control unit 101 places actuator mechanism selector 131 to the position corresponding to the particular zone gauge 90 is measuring at and the appropriate die actuator mechanism 70 is energized, such as a servomotor (not shown) that drives the die thimble actuator (not shown) to crank the die thimble (not shown) in portion to the output signal of controller 107 in the direction to bring the zone average thickness to the average width thickness. This operation is repeated for each position of gauge 90 until each of the die thimbles has been adjusted to bring about the substantial equality of zone average thickness and average width thickness.

A uniform thickness change across width 3 is accomplished by adjusting either the extruder output or the speed of the rolls. Controller 128 compares the average width thickness output signal from PAC 124 with the target signal from target source 126 and produces a control signal over line 132 that is a function of the difference between these signals. The control signal from controller 128 is coupled through a normally closed contact 152, actuated at another time by control unit 101, to drive a servomotor 133 coupled to a gear box 134 having an output shaft 135. The output shaft 135 can be coupled to either of the motor speed control mechanisms 68 or 87 to change the extruder flow or speed of the rolls in the direction and to the extent that the thickness of sheet 61 is changed as a function of the output signal of controller 128. The combined effect of these adjustments is to bring the thickness of sheet 61 substantially to the target thickness, where the output signal from controllers 107 and 128 is substantially zero.

Periodically control unit 101 initiates a scan by gauge 91 to recompute the width average thickness. Just prior to the scan PAC 124 is discharged by control unit 101 to prepare for another output signal from measuring contact 123. During the scan of gauge 90 and during the replacement of the average width thickness signal control unit 101 preferably terminates the adjustment of film casting line 60 by opening contacts 151 and 152. Then contacts 151 and 152 are closed to continue the control of the thickness of sheet 61.

The arrangement of timers, relays and contacts to perform the functions of control unit 110 in the described sequence is conventional engineering technique. The result is a control system that continuously develops the signals required to adjust film casting line 60 and programs these adjustments to continuously and rapidly maintain the thickness of sheet 61 at a target thickness.

Figure 7:
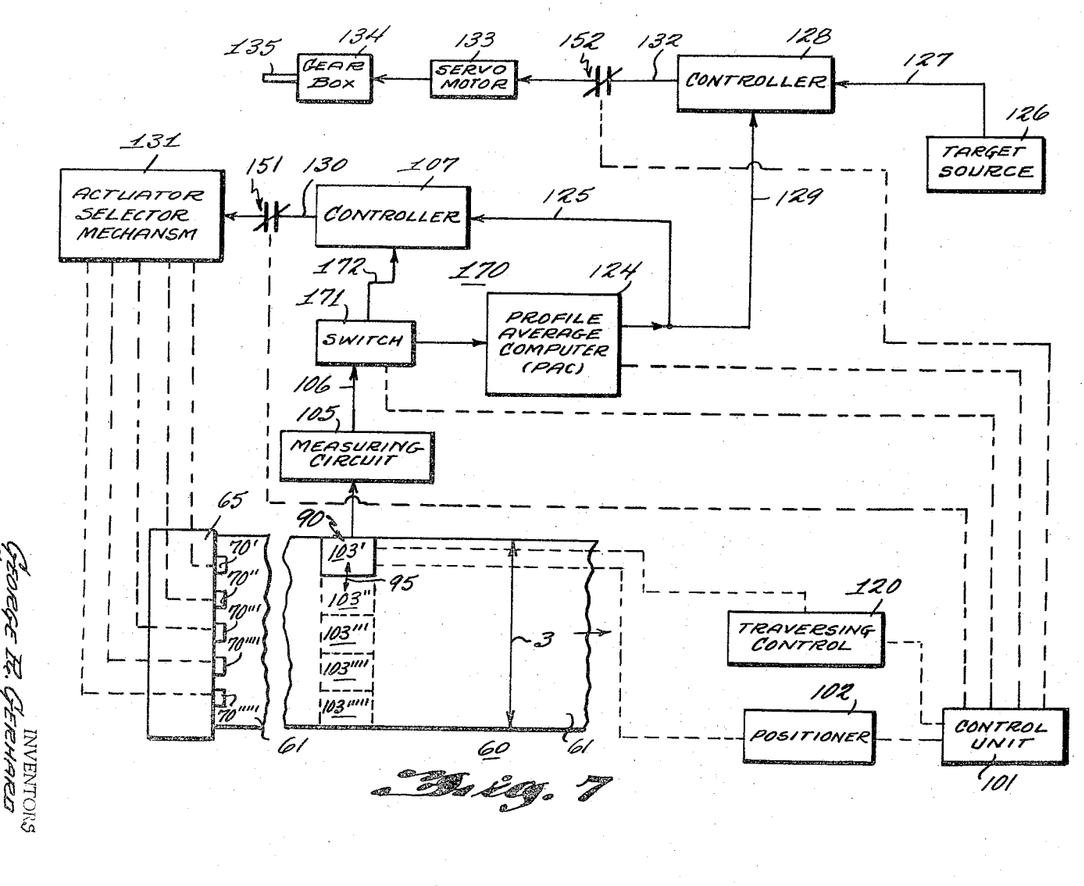
FIG. 7 is another control apparatus for adjusting the film casting line shown in FIGS. 4 and 5 in accordance with the present invention.

The adjustment of film casting line 60 can be performed by a control apparatus 170 (FIG. 7) very similar to control system 100 (FIG. 6) with the same reference numerals being applied to the same components. Only a single gauge, gauge 90 is used to measure the thickness of sheet 61. Gauge 90 is programmed by control unit 101 to scan sheet width 3 by actuating traversing control 120. The output signal from measuring circuit 105 during the scan is coupled over line 106 to a switch 171 which has two positions. Control unit 101 actuates switch 171 to a position that couples the output of measuring circuit 105 to PAC 124 during the scan of gauge 90. After the scan switch 171 is placed in the other position by control unit 101 to couple the output of measuring circuit 105 to controller 107 over line 172 for comparison with the input over line 125. The width average thickness is computed by PAC 124 from the measuring circuit output signal derived during the scan. Then gauge 90 is successively moved by positioner 102, actuated by control unit 101, to positions 103. Control apparatus 170 adjusts film casting line 60, as described previously for control apparatus 100. Gauge 90 scans periodically and width average thickness is recomputed periodically.

Other combinations of gauges can be utilized for measuring zone average thickness and width average thickness. For example, a separate gauge can be stationarily positioned at each zone, or one gauge can be positioned successively to several zones and another gauge can be positioned successively to several other zones. The ultimate combination for any one application will depend upon the process, the product, and on the economics of providing the control.

The basic functions of a control system to adjust a regulating apparatus in accordance with the present invention can be performed by several types and arrangements of circuits. For example, the control apparatus circuit 180 (FIG. 8) can be used to produce the essential signals of control apparatus 100 (FIG. 6) and, with only slight change, the essential signals of control apparatus 170.

Figure 8:
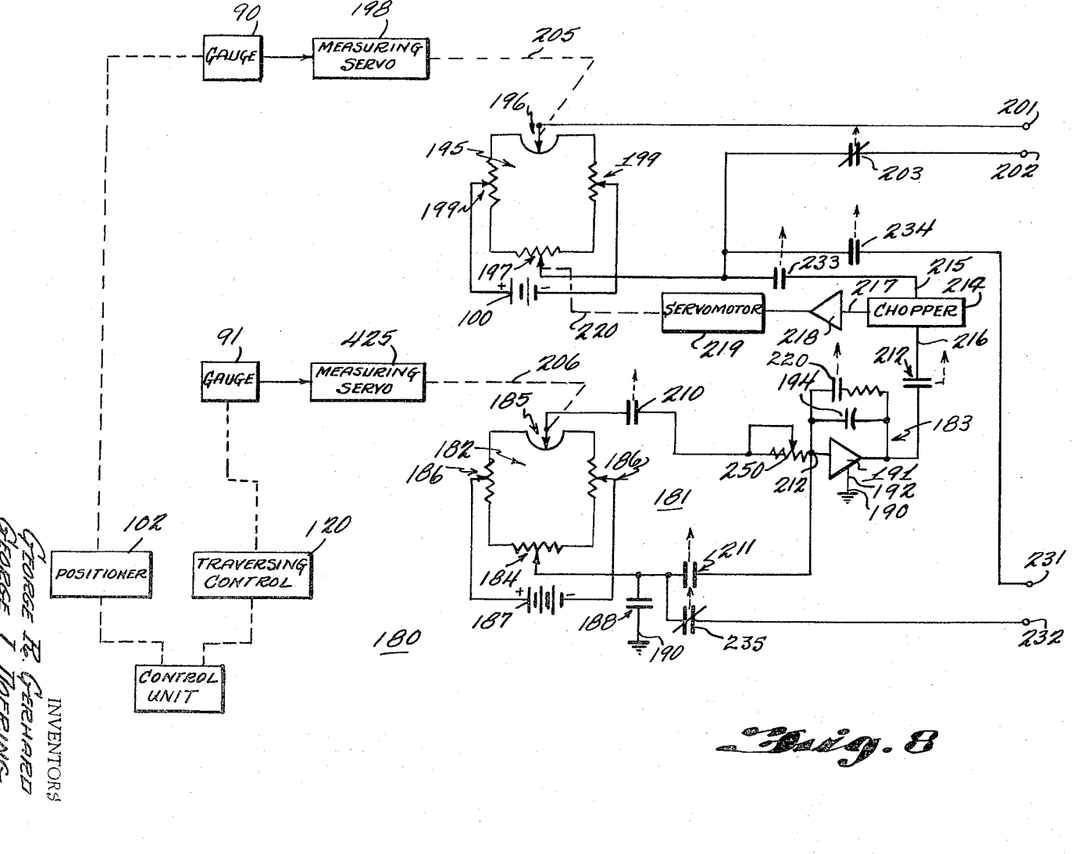
FIG. 8 is a circuit diagram of part of the control apparatus shown in FIG. 6.

In control apparatus circuit 180 the width average thickness signal is derived by a computer 181 comprising a bridge 182 and an integrator 183. Bridge 182 is of standard design including a target potentiometer (T pot.) 184 and a slidewire potentiometer (SW pot.) 185, adjustable resistors 186, and a D.C. source, such as battery 187. Computer bridge 182 compares the output signal of gauge 91, coupled to a measuring servo 425 that drives (indicated by line 206) the arm of SW pot. 185, to produce a target signal set by the arm of T pot. 184. Just prior to and during the scan of gauge 91 the arm of T pot. 184 is grounded by closing normally open contact 188 to ground 190. When the scan begins the arm of SW pot. 185 is coupled through a normally opened contact 210, now closed, to one input terminal 212 of an amplifier 191, the other input terminal 192 of amplifier 191 being connected to ground 190. Normally opened contact 211 between the arm of T pot. 184 and amplifier input 212 is opened. The input signal to amplifier 191 is the difference between the target signal of computer bridge 182 and the output signal of gauge 91 during the scan. Computer bridge 182 is set up so that when the sheet thickness is at target thickness the input to amplifier 191 is zero. Any deviation of sheet thickness from target thickness produces a signal with a polarity depending on whether target thickness is greater or less than the measured sheet thickness.

The difference signal, if any, from bridge 182, is integrated by a capacitor 194 forming part of an operational amplifier with amplifier 191 and an input adjustable resistor 250. The voltage across capacitor 194 is proportional to the average of the thickness deviation from the target thickness. This signal is used by control apparatus circuit 180, as will be mentioned in detail shortly, to obtain the average thickness across sheet 61.

The measurement of zone average thickness is made by gauge 90 which is moved successively to positions 103 by positioner 102, actuated by control unit 101. The output signal from gauge 90 is compared with a target signal by a computer bridge 195 to produce a control signal across output terminals 201 and 202. Computer bridge 195 includes a SW pot. 196 driven (as indicated by dash line 205) by a measuring servo 198 coupled to the output of gauge 90, a SW pot. 197, adjustable resistors 199, and a D.C. source, such as battery 100. Output terminal 201 is directly coupled to the arm of SW pot. 196 and output terminal 202 is coupled to the arm of T pot. 197 through a normally closed contact 203.

The target signal of computer bridge 195 is adjusted in response to the width average thickness. The voltage across capacitor 194 is coupled in series with the target signal from T pot. 184 of computer bridge 182 by opening contacts 188 and 210, closing contact 211, and closing a normally opened contact 212, at the opposite side of capacitor 194 from amplifier input 212 to an input 216 of a chopper 214. The other input signal to chopper 214 is the target signal of computer bridge 195, from a connection of the arm of T pot. 197 through a normally opened contact 233, now closed, to the chopper input 215. Chopper 214 compares the signals at inputs 215 and 216 and provides a signal at output 217 through amplifier 218 to a servomotor 219 that drives (as indicated by dash line 220) the arm of T pot. 197. The arm of T pot. 197 is driven until the series of the target signal from computer bridge 182 and average thickness deviation signal of capacitor 194 equal the target signal of T pot. 197, bringing the target signal of computer bridge 195 to a signal corresponding to the width average thickness of sheet 61.

The target signal of computer bridge 195 is reset periodically to a current width average thickness. Before another scan of gauge 91 occurs capacitor 194 is discharged by closing normally opened contact 220 in a parallel circuit. Computer 181 is set up for another scan, as described above, and T pot. 197 is reset to produce the target signal for the new width average thickness.

Film casting line 60 is adjusted by the control signal at terminals 201 and 202 in response to any average zone thickness change from width average thickness. After the width average thickness is set into T pot. 197, computer bridge 195 compares the average zone thickness, indicated by the output signal of gauge 90, with the width average thickness target signal. The difference between these signals is the control signal at terminals 201 and 202, the arm of SW pot. 196 being coupled to terminal 201 and a normally closed contact 203, opened during the computation of width average thickness, being closed to connect the arm of T pot. 197 to terminal 202. The control signal at terminals 201 and 202 is connected to actuator mechanism selector 131 (FIG. 6) that energizes the appropriate one of die actuating mechanisms 70 for the measured zone to change the zone average thickness to the width average thickness.

The uniform thickness change across sheet width 3 is initiated by a control signal at terminals 231 and 232 that is a function of the difference between width average thickness and the target thickness. The input signals to chopper 214 are disconnected by opening contacts 212 and 233, and the arm of SW pot. 197 is connected through a normally closed contact 234, opened during the computation of width average thickness, to terminal 231. Terminal 232 is connected to the arm of T pot. 184 by closing normally closed contact 235, opened during the computation of width average thickness. The control signal at terminals 231 and 232 is the difference between the target signal of T pot. 184 (target thickness) and the target signal of T pot. 197 (width average thickness). This control signal is coupled to servo 133 (FIG. 6), as described above, to change the extruder motor speed or the speed of the rolls to alter the sheet thickness to the target thickness.

The actuation of the several contacts of control apparatus circuit 181 in the described sequence is provided by control unit 101. This sequence is repeated periodically.

A zone property average can be determined by the proper location of a stationary gauge in the zone. Another approach, as previously described in connection with the apparatus of FIG. 1 and the graph of FIG. 3, is to find the zone property average by scanning the zone with a gauge and processing the gauge output signal to compute the zone property average. This approach can be accomplished by several types and arrangements of control apparatuses, such as the control apparatus 251 shown in FIGS. 9 through 12 for controlling film casting line 60, for example. Film casting line 60 is shown only partially in FIG. 9 to simplify the presentation.

The film sheet 61 extruded from die 65 (FIG. 9) is divided into zones 256, 255, 254, 253 and 252 across the entire width 3, as designated by the corresponding marked dimension lines. These zones correspond to the area of predominate effect of die actuator mechanisms 70', 70'', 70''', 70'''', and 70''''', respectively, to vary the zone thickness. Actuator mechanism selector 131, as previously described, controls the die actuator mechanisms 70, and in this embodiment comprises reversible motors 259 (FIGS. 9 and 10) coupled through a suitable mechanical transmission (not shown) to the respective die actuator mechanisms 70 (each motor 259 bearing a prime mark corresponding to the controlled die actuator mechanism 70).

Figure 9:
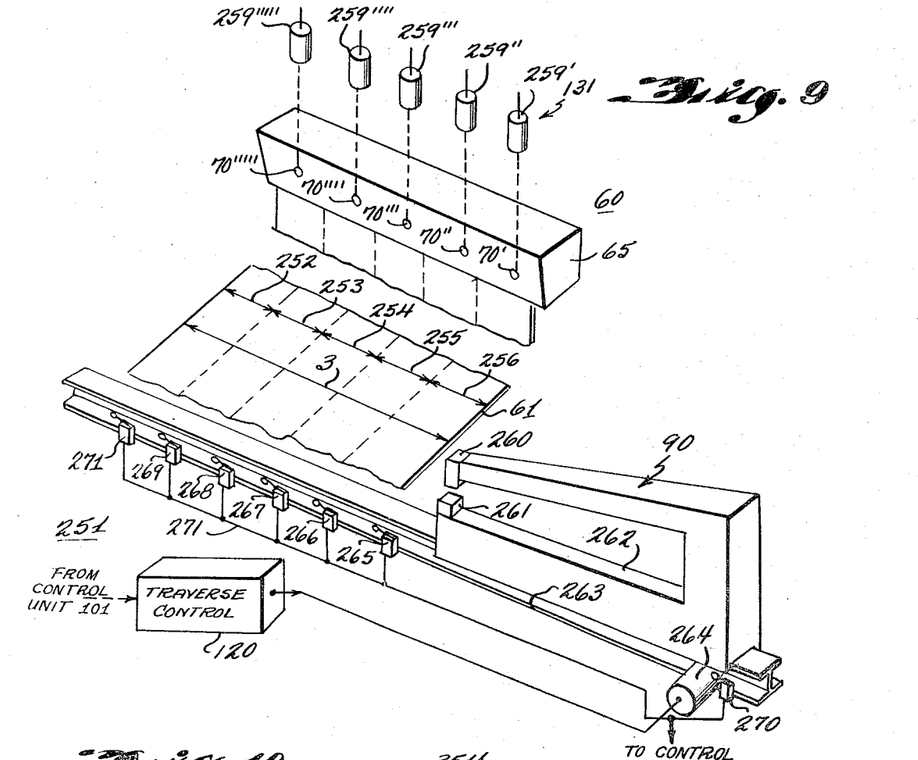
FIG. 9 is a perspective view of part of a control apparatus for the film casting line shown in FIGS. 4 and 5 in accordance with the present invention.
Figure 12:
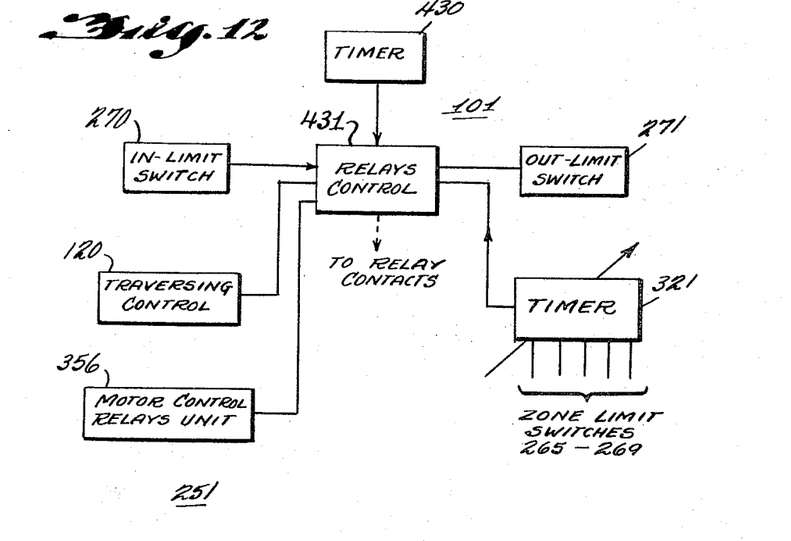
FIG. 12 is a block diagram of the part of a control apparatus that programs the operation for adjustment of a film casting line as depicted in part in FIG. 9 and shown in FIGS. 4 and 5.

Thickness measurement is the function of gauge 90, shown in some detail as a transmission gauge having a detector 260 and a radioactive source 261 mounted on opposite arms of a U-frame 262. U-frame 262 slides on a rail 263, driven by a traverse motor 264 through a suitable chain drive (not shown) as is conventional practice. On gauge 90 are several limit switches that serve the function of actuating the control apparatus 251 at the time gauge 90 enters into a zone and at the in limit or out limit of its travel. In this embodiment the limit switches 265, 266, 267, 268, 269 on rail 263 are tripped when the measuring head, detector 260 and source 261, enters zones 256, 255, 254, 253, and 252, respectively, and limit switch 270 is at the in limit and limit switch 271 is at the out limit on rail 263. These limit switches are connected to separate lines on a cable 271 and go to control unit 101 (FIG. 12). Traverse motor 164 is actuated by traverse control 120 in response to the operation of control unit 101.

The movement of gauge 90 and the operation of the switches in control apparatus 251 is the function of control unit 101. The control signals for adjusting film casting line 60 are produced by a sequence of operations, including scans by gauge 90 and electronic computation from the output signal of gauge 90.

The first operation is to obtain the signal that is a function of the average thickness across width 3. Essentially the same circuit arrangement is utilized as in control system circuit 180, previously described. Gauge 90 is moved by traversing control 120, actuated by control unit 101, to scan width 3. Upon completion of the scan, out limit switch 271 signals control unit 101 to return gauge 90 to its off-sheet position and gauge 90 is brought to position shown in FIG. 9, signaled by in-limit switch 270. The output signal from gauge 90 is coupled to measuring servo 198 (FIG. 11) that drives the arm of a SW pot. 290 of a bridge 291 of computer 292. Computer 292 also includes an integrator 183. The output signal from the scan of width 3 is compared with a target signal, set by the arm of a T pot. 294, by connecting this arm through contact 295 to ground 190 and closing contact 297 to connect the arm of SW pot. 290 to the input of integrator 183. The voltage produced across capacitor 194 is a function of the average deviation of the width thickness from target thickness. Then the voltage across capacitor 194 is placed in series with the target thickness signal, by opening contact 295, closing contact 299 and opening contact 297. This combination of signals is equal to the width average thickness signal and is coupled to an input 215 of a chopper 214 through contact 302, opened during the computation of width average thickness. Chopper 214 compares the width average thickness signal with a target signal from T pot. 303, by closing contact 304 connecting the arm of T pot. 303 to input 216 of chopper 301. The output of chopper 214 at 217 is the difference between the signals at inputs 216 and 215. This output signal is coupled, by closing contact 308, through an amplifier 309 to a servomotor 310 that drives, as indicated by dash line 306, the arm of T pot. 303 and a pen of recorder 311. The arm of T pot. 303 is adjusted until the target signal of T pot. 303 is equal to the width average thickness signal.

Once the width average thickness signal is set into T pot. 303 switch 308 is opened to disconnect the drive to servomotor 310 and the computation of each zone average for comparison with the target signal of T pot. 303 begins. Recorder 311 graphically plots the width average thickness.

Gauge 90 is moved by control unit 101 to successively scan the zones of sheet 61. A zone is scanned; the zone average thickness is computed, and actuator mechanism selector 131 controls the appropriate one of die actuator mechanisms 70 to bring the zone average thickness to the width average thickness.

Before gauge 90 starts over zone 256, control unit 101 discharges capacitor 194, by closing contact 220 in a parallel circuit. When gauge 90 starts over zone 256 limit switch 265 signals control unit 101 to connect the output from bridge 291 formed by SW pot. 290 and T pot. 294 to integrator 183. Contact 297 closes, contacts 322 and 299 are opened, contact 304 is opened, and the arm of T pot. 294 is connected by contact 295 to ground 190. This arrangement is maintained for a time period determined by adjustable timer 321 (FIG. 12) of control unit 101. The signal from limit switch 265 sets up this arrangement, hereinafter termed the zone average computing set up, for a time less than the period it takes gauge 90 to reach zone 255. A multivibrator having an adjustable pulse duration can control the duration of the zone average computing set up. Gauge 90 is stopped by control unit 101 activating traversing control 120 before it scans the next zone. The signal coupled to integrator 183 is the deviation of the zone thickness from the target thickness. This deviation signal is integrated to produce a voltage across capacitor 194 that is a function of the average devitaion of zone thickness from the target thickness.

Computer 292 is arranged now to provide a zone average thickness target signal from T pot. 330. Contact 295 is opened, and contact 299 is closed to connect the target signal of T pot. 294 in series with the voltage across capacitor 194, the combination being equal to the zone average thickness signal. This signal is coupled to chopper input 215 by closing contact 302 and the target signal of T pot. 330 is coupled to the chopper input 216, by closing contact 331 connecting the arm of T pot. 330 to chopper input 216. Contact 304 remains open. The signal at chopper output 217 is coupled through contact 332, contact 308 being opened, and amplifier 333 to servomotor 334. Servomotor 334 drives, as indicated by dash line 335, the arm of T pot. 330 to a position corresponding to a target signal equal to the zone average thickness signal and also drives a pen on recorder 336. Recorder 336 graphically displays the zone average thickness. The arrangement of computer 292 to set the T pot. 330 to the zone average thickness is hereinafter called the zone average readout set up.

Following the zone average computing set up and the zone average readout set up of computer 292, the control signal for adjusting the scanned zone thickness is produced at output terminals 339 and 340. The arrangement, termed the control set up, comprises closing contact 337 to connect output terminal 340 to the arm of T pot. 330 and closing contact 322 to connect the arm of T pot. 303 to output terminal 339, contacts 331 and 304 being opened. The control signal at output terminals 339 and 340, the zone thickness control signal, is a function of the difference between the target signal of T pot. 303 (width average thickness signal) and the target signal of T pot. 330 (zone average thickness signal).

Figure 10:
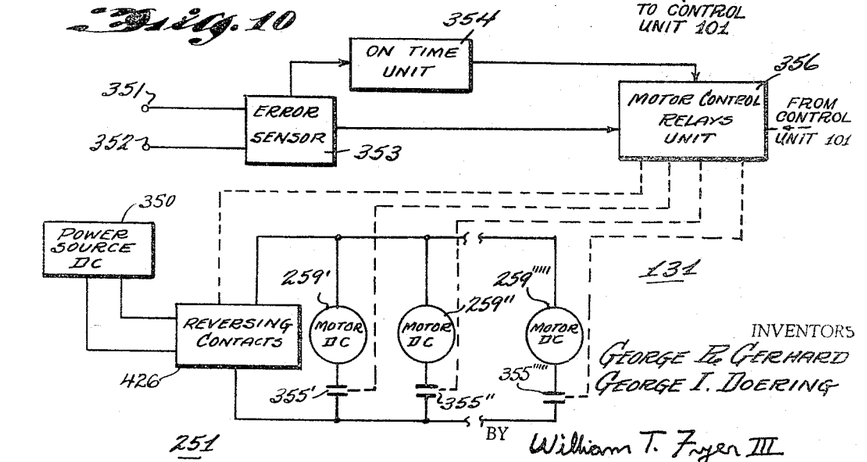
FIG. 10 is a circuit diagram of an actuator mechanism selector for extruder die shown in FIG. 9.

During the control set up the zone thickness control signal is coupled to actuator mechanism selector 131 (FIG. 10) that, according to the control signal amplitude and polarity energizes the appropriate one of motors 259 to change the zone thickness. The zone thickness is changed to bring the zone average thickness to the width average thickness. Actuator mechanism selector 131 can take several forms, such as the use of reversible D.C. motors 259 energized from a common D.C. power source 350. The control signal is coupled to the input terminals 351 and 352 of error sensor 353 of conventional design that senses the polarity of the control signal and feeds an on time unit 354 that closes one of contacts 355 through motor control relays unit 356 for a time period proportional to the control signal amplitude. Error sensor 353 selects the direction of rotation of motors 259 and operates current reversing switch 426 through motor relays control unit 356, to change the zone thickness in the desired direction. Control unit 101 sets motor control relays 356 to actuate the appropriate one of motors 259 for the scanned zone. The circuit of FIG. 10 is a simplified presentation of actuator mechanism selector 131 to show only the general functions of one embodiment.

The adjustment of the other zones follows the same pattern as described above. First, integrator 183 is discharged and computer 292 is placed in the zone average computing set up as described previously, to obtain the average thickness signal for the next zone. Timer 430 changes computer 292 to the zone average readout set up, previously described, prior to gauge 90 scanning the next zone, zone 255, as is the case for each of the successive zone scans. Then computer 292 is placed in the control set up, previously described, the zone thickness control signal adjusts the zone thickness through actuator mechanism selector 131 and the cycle continues until each zone is adjusted to the width average thickness.

After each zone has been adjusted to the width average thickness, the control signal for the uniform width thickness adjustment is produced at output terminals 341 and 342. Output terminal 341 is connected to the arm of T pot. 294, by closing contact 343, contacts 299 and 295 being opened, and output terminal 342 is connected to the arm of T pot. 303. The width thickness control signal is the difference between the target signal of T pot. 294 (target thickness) and the target signal at T pot. 303 (width average thickness). The width thickness control signal is coupled to servomotor 133 (FIG. 6) to change either the extruder motor speed or the speed of the rolls to bring by uniform adjustment of sheet 61, the sheet thickness to the target thickness.

Control system 251 performs the aforementioned cycle of operation periodically to recompute the width average thickness and readjust the average zone thickness to the target thickness. The described operation of the relay contacts, traversing control 120, motor control relay unit 356 and the utilization of the in-limit switch 270 and out-limit switch 271 is the function of relays control 431 of control unit 101 (FIG. 12). The detailed arrangement of control circuit 101 is engineered without difficulty simply from the described functions and illustrated arrangement circuit of components.

Figure 13:
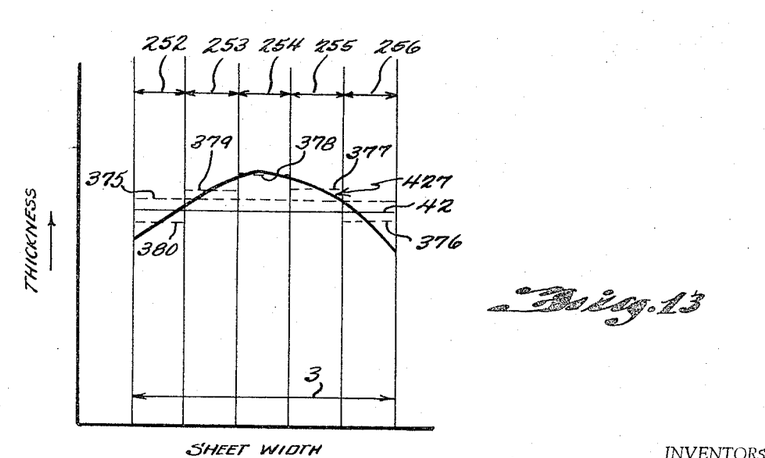
FIG. 13 is a graph showing a thickness profile, the thickness average in several zones, the entire film thickness average, and the target thickness across the width of a film produced by a film casting line as depicted in part in FIG. 9 and shown in FIGS. 4 and 5.
Figure 14:
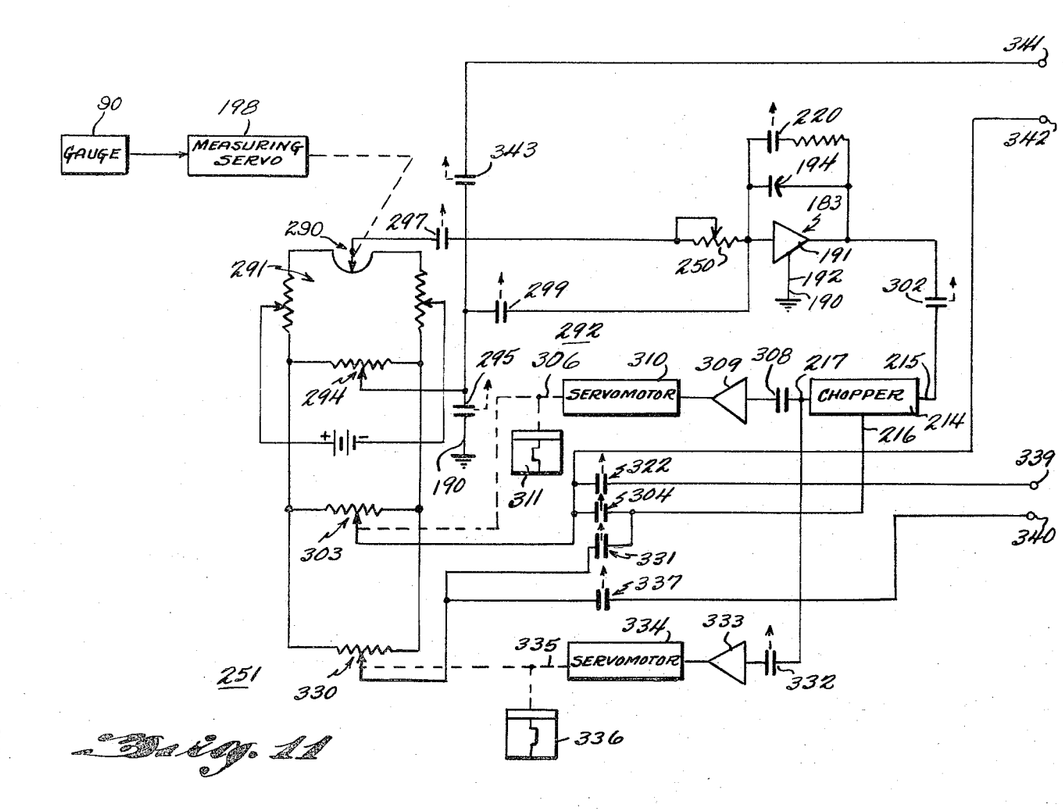

The operation of control system 251 can be visualized by referring to FIG. 13 where the thickness profile 427 and target thickness 42 for a typical sheet 61 are shown. The object of control system 251 is to bring the sheet thickness as close as possible to target thickness 42 all across its width 3. Gauge 90 scans sheet 61 to measure the thickness across width 3. The width avearge thickness is computed, represented by line 375 and set into T pot. 303 to produce a target signal that is a function thereof. Gauge 90 then scans zone 256 and during the zone average computing set up the average thickness of zone 256, represented by line 376, is computed and set into T pot. 330 to produce a signal that is a function thereof. The zone average control signal produced during the zone average readout set up of computer 251 energizes motor 259' to increase the average thickness of zone 256 to the width average thickness 375. Then gauge 90 scans zone 255 and the operations of computer 251 are repeated for computing the zone average thickness and adjusting motor 259", except that the zone average thickness 377 is greated than the width average thickness 375 and motor 259" decreases the average thickness of zone 256 to the width average thickness 375. Zones 254 and 253 are successively scanned and the average thicknesses 378 and 379, respectively, being greater, are decreased to the width average thickness 375. Next, zone 252 is scanned; its average thickness 380 is computed and motor 259''''' increases the thickness of zone 252 to the width average thickness 375. Following the adjustment of the zones to the width average thickness, the control signal for the adjustment uniformly across width 3 energizes the adjustment that decreases the sheet thickness uniformly as a function of the difference between width average thickness 375 and target thickness 42 to reduce the difference to zero. The width average thickness is adjusted to the target thickness 42 and the average thickness of each zone is at target thickness 42.

It is apparent that, when the width average thickness is determined, the average thickness of the zones will fall above and below the width average thickness. The average thickness of each zone is adjusted to the width average thickness. By employing a scanning gauge for each zone and another gauge to scan the width 258, the separate adjustments of zone thickness and the uniform adjustment of width thickness can be performed simultaneously. As the zones become small, the gauges can be located stationarily and indicate zone average thickness and the simultaneous adjustment can be performed.

Other arrangements of gauges can be used following the teaching of the present invention and the control system circuit can take several forms. The arrangements and changes in the disclosed embodiments of apparatus for practicing the method are included within the scope of the present invention as defined in the appended claims.

We claim:

1. A control apparatus for a regulating apparatus having a first means for separately varying the property in individual zones across a material dimension and second means for uniformly varying the property across the material dimension including said zones, to maintain a uniform property in a material across the material dimension, said control apparatus comprising, means for measuring the property average across the material dimension including said zones, and for measuring the property average of each of said zones, and control means for comparing said property average measurement across the material width including said zones with said property average measurement for each of said zones to produce a first control signal for actuating said first means and varying the property in each of said zones toward the property average across the material dimension including said zones, said first control signal being a function of the difference between the zone property average and the property average across the material width including said zones, and for comparing said property average measurement across the material dimension including said zones and a property target to produce a second control signal for actuating said second means and uniformly varying the property across the material dimension toward said property target, said second control signal being a function of the difference between said property target and said property average measurement across the material dimension including said zones.

2. A control apparatus for a regulating apparatus that includes a first profile regulating stage means having at least two control elements disposed across the width of a material to vary separately the material thickness in separate zones and second profile regulating stage means displaced along the elongation direction of the material from said first regulating stage means to vary uniformly the thickness across the material width, to maintain a uniform thickness across the elongated material passing from said regulating apparatus, said control apparatus comprising, means for indicating the average thickness across the material width and for indicating the average thickness in each of said zones, controller means coupled to said gauge means to compare the average thickness indication across the width with the thickness average indication for each of said zones to produce a first control signal to be coupled to said first profile regulating stage for actuating the respective elements to change the material thickness avearge in the respective zones to the average thickness indication across the width, and to compare the average thickness indication across the width with a target thickness to produce a second control signal for energizing said second profile regulating stage means to uniformly change the thickness across the material width from said average thickness across the width to said target thickness.

3. Control apparatus for a regulating apparatus having a formable material extruding from a die and passing on a cooling roll, a number of pull rolls to a winding roll, the extruder die having actuators that can separately vary the thickness of the material extruding from the die at individual zones along the material width, and the regulating apparatus having a first means for uniformly varying the material thickness across the width either by altering the material input rate to the die or by altering the relative speed of one or all of the cooling roll, pull rolls, and winding roll, the control apparatus comprising, means for measuring the average material thickness of each of said zones and for measuring the average material thickness across the material width including said zones, controller means coupled to said measuring means to produce a first control signal to be coupled to said extruder die actuators to energize the respective actuators when the average material thickness in the respective zones deviates from the material average thickness and to produce a second control signal for energizing said first means when said average material thickness across the width including said zones deviates from said target thickness.

4. Apparatus for maintaining a uniform property profile in an elongated material, comprising,
  a number of first actuator means disposed across the material width to vary separately the material property uniformly in individual zones and a second actuator means for uniformly varying the property across the material width including said zones,
  means for indicating the property average across the material width including said zones and for indicating the property average in each of said zones,
  first controller means coupled to said first actuator means to compare the property average indication across the width and the average property indication from each of the zones to energize the respective first actuator means and change the average property in the respective zone to the average property across the width, and
  second controller means coupled to said second actuator means to compare the property average indication across the width with a target property and energize said second actuator means to uniformly change the property average across the material width to said target property.

5. Apparatus, as described in claim 4, wherein,
  said indicating means comprises a first radiation gauge, a second radiation gauge, and a control means that periodically programs said first radiation gauge across the material width to obtain an indication of the property across the material width including said zones and programs said second radiation gauge succesively to a location in each of said zones where the property is substantially at the average zone property to obtain a zone average property indication,
  said second controller means integrates the indication from the first radiation gauge during the scan across the material width to obtain an indication of the average property across the material width including said zones,
  said first controller means successively receives the first radiation gauge indications for each of said zones and successively energizes the respective first actuator means to change the respective zone property average to said width average property.

6. Apparatus, as described in claim 4, wherein,
  said indicating means comprises a first radiation gauge, a second radiation gauge, and a control means that periodically programs said first radiation gauge across the material width to obtain an indication of the property across the material width including said zones and programs said second radiation gauge successively to scan each of said zones,
  said second controller means integrates the indication from the first radiation gauge during the scan across the material width to obtain an indication of the average property across the material width,
  said first controller means successively integrates the first radiation gauge indications for each of said zones to obtain the property average for each of said zones and successively energizes the respective first actuator means to change the respective zone property average to said width average property.

7. Apparatus, as described in claim 4, wherein,
  said indicatnig means comprises a radiation gauge and a control means that periodically programs said radiation gauge across the material width to obtain an indication of the property across the material width and programs said radiation gauge successively to a location in each of said zones where the property is substantially at the average zone property to obtain an average property indication for each zone, and
  said second controller means integrates the indication from the radiation gauge during the scan across the material width to obtain an indication of the average property across the material width,
  said first controller means successively receives the radiation gauge indications for each of said zones and successively energizes the respective first actuator means to change the respective zone property average to said width average property.

8. Apparatus, as described in claim 4, wherein,
  said indicating means comprises a radiation gauge and a control means that periodically programs said radiation gauge across the material width to obtain an indication of the property across the material width and programs said radiation gauge successively to scan each of said zones, and
  said second controller means integrates the indication from the radiation gauge during the scan across the material width to obtain an indication of the average property across the material width,
  said first controller means successively integrates the radiation gauge indications for each of said zones to obtain the property average for each of said zones and successively energizes the respective first actuator means to change the respective zone property average to said width average property.

References Cited by the Examiner

UNITED STATES PATENTS

| | | | |
|---|---|---|---|
| 2,726,922 | 12/1955 | Merrill et al. | 18—21 |
| 2,909,660 | 10/1958 | Alexander. | |
| 3,000,438 | 9/1961 | Alexander. | |
| 3,015,974 | 1/1962 | Orbom et al. | |
| 3,024,404 | 3/1962 | Ziffer. | |
| 3,091,800 | 6/1963 | Gould et al. | 18—21 |
| 3,150,213 | 9/1964 | Doering | 18—21 X |

WILLIAM J. STEPHENSON, *Primary Examiner.*

UNITED STATES PATENT OFFICE
CERTIFICATE OF CORRECTION

Patent No. 3,307,215            Dated March 7, 1967

Inventor(s) George R. Gerhard and George I. Doering

Figure 4:
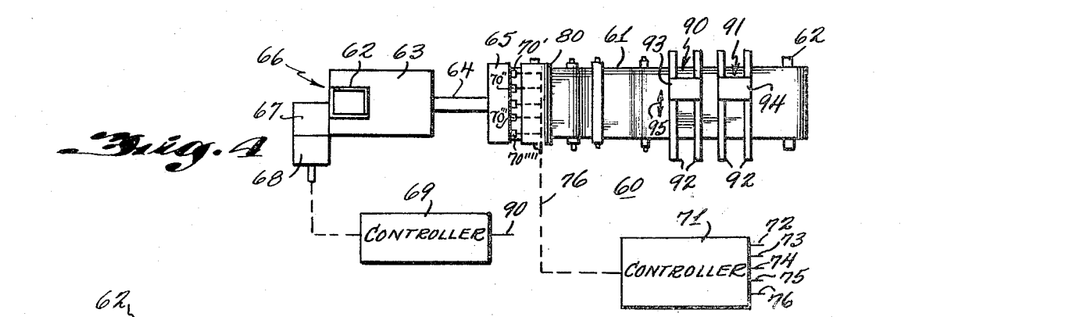
FIG. 4 is a plan view of a film casting line on which the method of the present invention can be practiced.
Figure 5:
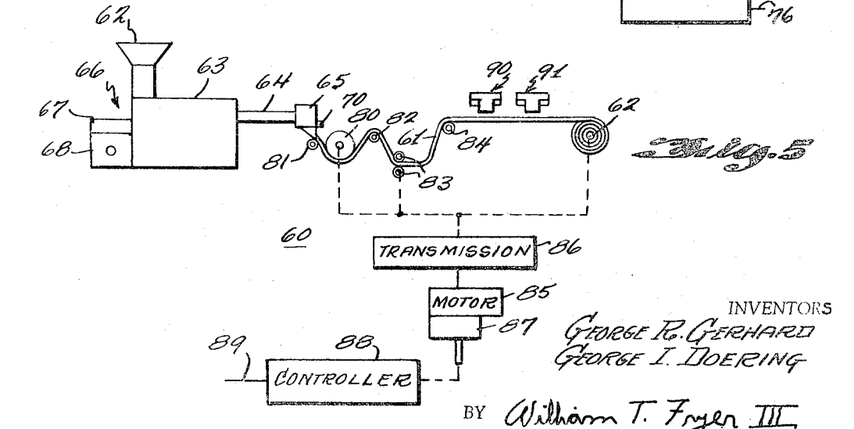
FIG. 5 is an elevation view of the film casting line shown in FIG. 4.

It is certified that error appears in the above-identified patent and that said Letters Patent are hereby corrected as shown below:

Figure 4 and figure 5, reference number "62" referring to the winding roll at the upper right of the figures, should read ---77---.
Column 1, line 49, "mahcine" should read ---machine---.
Column 5, line 15, "3" should read ---21---; column 5, line 48 "roll 62." should read ---roll 77.---.
Column 6, line 29, "82" should read ---80---.
Column 7, line 1, "aea" should read ---area---; column 7, line 48, "portion" should read ---proportion---.
Column 13, line 7, "relay" should read ---relays---; column 13 line 34, "greated" should read ---greater---.

Signed and sealed this 26th day of October 1971.

(SEAL)
Attest:

EDWARD M. FLETCHER, JR.      ROBERT GOTTSCHALK
Attesting Officer               Acting Commissioner of Patents